US008818277B2

(12) United States Patent
Chen

(10) Patent No.: US 8,818,277 B2
(45) Date of Patent: Aug. 26, 2014

(54) METHOD, APPARATUS AND SYSTEM FOR TRANSMITTING MULTIMEDIA DATA BY BLUETOOTH AND REAL-TIME PLAYING

(75) Inventor: Xiaofeng Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 239 days.

(21) Appl. No.: 13/509,003

(22) PCT Filed: May 19, 2010

(86) PCT No.: PCT/CN2010/072932
§ 371 (c)(1),
(2), (4) Date: May 10, 2012

(87) PCT Pub. No.: WO2010/148840
PCT Pub. Date: Dec. 29, 2010

(65) Prior Publication Data
US 2012/0244811 A1 Sep. 27, 2012

(30) Foreign Application Priority Data

Nov. 24, 2009 (CN) .......................... 2009 1 0224823

(51) Int. Cl.
H04B 7/00 (2006.01)
H04L 29/06 (2006.01)
H04M 1/725 (2006.01)
H04L 12/18 (2006.01)
H04W 4/18 (2009.01)
H04W 4/00 (2009.01)
H04W 84/18 (2009.01)

(52) U.S. Cl.
CPC ......... H04M 1/7253 (2013.01); H04L 65/4069 (2013.01); H04L 65/602 (2013.01); H04M 2250/64 (2013.01); H04W 4/18 (2013.01); H04W 4/00 (2013.01); H04W 84/18 (2013.01); H04L 12/1827 (2013.01)
USPC .......... 455/41.2; 455/41.3; 709/231; 709/232

(58) Field of Classification Search
CPC ..... H04W 84/18; H04W 84/20; H04L 12/189
USPC ............... 455/41.2, 41.3, 41.1; 709/230, 231, 709/232, 235, 200; 705/21; 386/330, 332, 386/334; 370/465
See application file for complete search history.

(56) References Cited

U.S. PATENT DOCUMENTS
8,237,856 B2 * 8/2012 Boland et al. ................. 348/376
(Continued)

FOREIGN PATENT DOCUMENTS
CN 1516351 A 7/2004
CN 1901548 A 1/2007
CN 101459818 A 6/2009
(Continued)

OTHER PUBLICATIONS
International Search Report in international application No. PCT/CN2010/072932, mailed on Sep. 2, 2010.
(Continued)

Primary Examiner — Nay A Maung
Assistant Examiner — Angelica M Perez
(74) Attorney, Agent, or Firm — Oppedahl Patent Law Firm LLC

(57) ABSTRACT

The disclosure discloses a method, an apparatus and a system for transmitting multimedia data by bluetooth and real-time playing, wherein the method includes: a bluetooth apparatus at a transmitting terminal encodes multimedia files to be transmitted, and converts them into stream media files; the bluetooth apparatus at the transmitting terminal transmits the stream media files to a bluetooth apparatus at a receiving terminal through an Object Push Profile (OPP); the bluetooth apparatus at the receiving terminal plays the received stream media files. It is because the bluetooth apparatus at the transmitting terminal transmits the stream media files through the OPP and the bluetooth apparatus at the receiving terminal receives and plays them, and then the waiting time for playing is reduced. It is solved the problem in the prior art that audio or video playing can be carried out only after the completion of the transmission by bluetooth and the waiting time is longer.

8 Claims, 3 Drawing Sheets

(56) References Cited

U.S. PATENT DOCUMENTS

2005/0286508 A1    12/2005  Talguk
2007/0220552 A1*    9/2007  Juster et al. ..................... 725/46
2010/0086277 A1*    4/2010  Craner ............................ 386/52
2012/0244811 A1*    9/2012  Chen ............................ 455/41.2
2013/0044992 A1*    2/2013  Boland et al. ................. 386/224
2013/0128067 A1*    5/2013  Boland et al. ............. 348/211.2

FOREIGN PATENT DOCUMENTS

EP          1603298 A1    12/2005

OTHER PUBLICATIONS

English Translation of the Written Opinion of the International Search Authority in international application No. PCT/CN2010/072932, mailed on Sep. 2, 2010.

* cited by examiner

METHOD, APPARATUS AND SYSTEM FOR TRANSMITTING MULTIMEDIA DATA BY BLUETOOTH AND REAL-TIME PLAYING

TECHNICAL FIELD

The disclosure relates to the field of communication technologies, and in particular to a method, an apparatus and a system for transmitting multimedia data by bluetooth and real-time playing.

BACKGROUND

The bluetooth wireless technology is a short-distance wireless communication technology, aiming at replacing a cable used for connecting portable apparatuses and/or fixed electronic apparatuses. The main feature of the bluetooth wireless technology is in powerful functions, low power consumptions and low costs. Many functions in core specifications are optional so as to realize product diversity. A core system of bluetooth comprises a Radio Frequency (RF) transceiver, a base band and a protocol stack, and the system can provide a connection service for apparatuses and support exchange of various data between the apparatuses.

In order to use the bluetooth wireless technology, it is necessary for an apparatus to translate specific bluetooth profiles which have defined possible applications. The bluetooth profiles express general behaviors by which a bluetooth apparatus can communicate with other apparatuses. The bluetooth technology defines extensive profiles and describes many application cases of different types. At present, popular bluetooth profiles comprise an Advanced Audio Distribution Profile (A2DP), a File Transfer Protocol (FTP), a Handfree Profile (HFP), Heat Shock Protein (HSP) and an Object Push Profile (OPP), etc. The OPP defines two roles, namely, a push server and a push client, and is mainly used for data transmission between bluetooth apparatuses.

In the prior art, audio files and video files can be transmitted by the bluetooth technology, and the received audio files and video files are processed at a bluetooth receiving terminal for playing. In the prior art, audio or video playing can be carried out only after completion of transmission by bluetooth, therefore waiting time is longer.

SUMMARY

In order to solve the problem in the prior art that audio or video playing can be carried out only after completion of transmission by bluetooth and waiting time is longer, an embodiment of the disclosure provides a method for transmitting multimedia data by bluetooth and real-time playing, which comprises:

encoding multimedia files to be transmitted and converting them into stream media files by a bluetooth apparatus at a transmitting terminal;

transmitting the stream media files by the bluetooth apparatus at the transmitting terminal to a bluetooth apparatus at a receiving terminal through an Object Push Profile (OPP); and receiving the stream media files and playing the received stream media files by the bluetooth apparatus at the receiving terminal.

Meanwhile, an embodiment of the disclosure further provides a bluetooth apparatus at a transmitting terminal, which comprises:

the encoder is configured to encode multimedia files to be transmitted and convert them into stream media files; and the bluetooth module at the transmitting terminal is configured to transmit the stream media files to a bluetooth apparatus at a receiving terminal through an Object Push Profile (OPP).

Meanwhile, an embodiment of the disclosure further provides a bluetooth apparatus at a receiving terminal, which comprises:

the bluetooth module at the receiving terminal is configured to receive stream media files; and the player is configured to play the received stream media files.

Meanwhile, an embodiment of the disclosure further provides a system for transmitting multimedia data by bluetooth and real-time playing, which comprises:

the bluetooth apparatus at the transmitting terminal is configured to encode multimedia files to be transmitted, convert them into stream media files and transmit the stream media files to the bluetooth apparatus at the receiving terminal through an Object Push Profile (OPP); and the bluetooth apparatus at the receiving terminal is configured to receive the stream media files and play the received stream media files.

It can be seen from the specific embodiment provided by the disclosure that waiting time for playing is reduced because the bluetooth apparatus at the transmitting terminal transmits stream media files through the OPP and the bluetooth apparatus at the receiving terminal receives and plays them.

DETAILED DESCRIPTION

Figure 1:
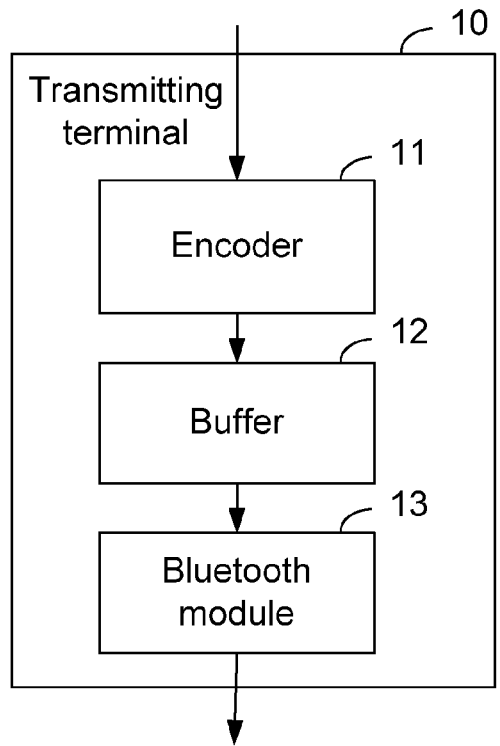
FIG. 1 shows a structure diagram of a bluetooth apparatus at a transmitting terminal according to the first embodiment provided by the disclosure.
Figure 2:
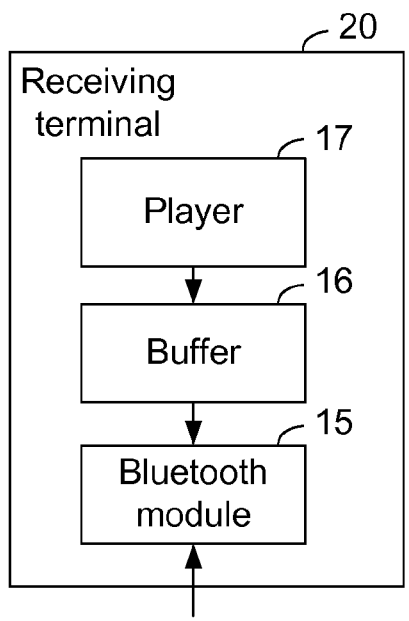
FIG. 2 shows a structure diagram of a bluetooth apparatus at a receiving terminal according to the first embodiment provided by the disclosure.
Figure 3:
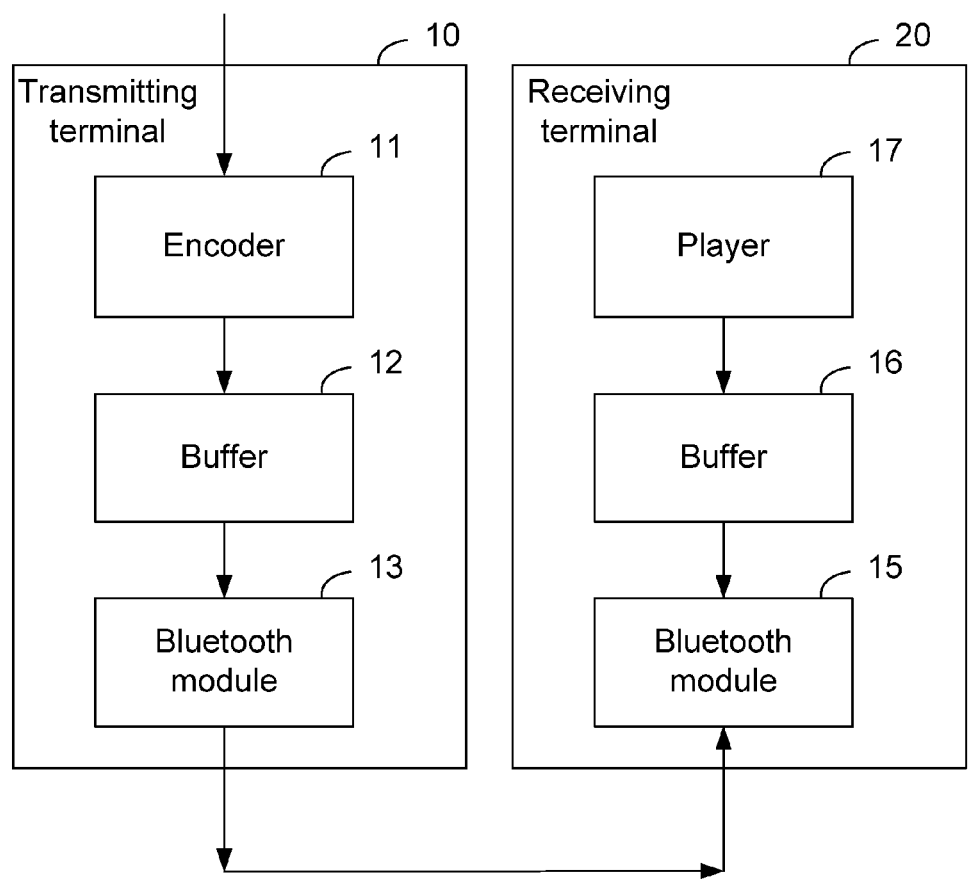
FIG. 3 shows a structure diagram of each part of a bluetooth system according to the first embodiment provided by the disclosure.
Figure 4:
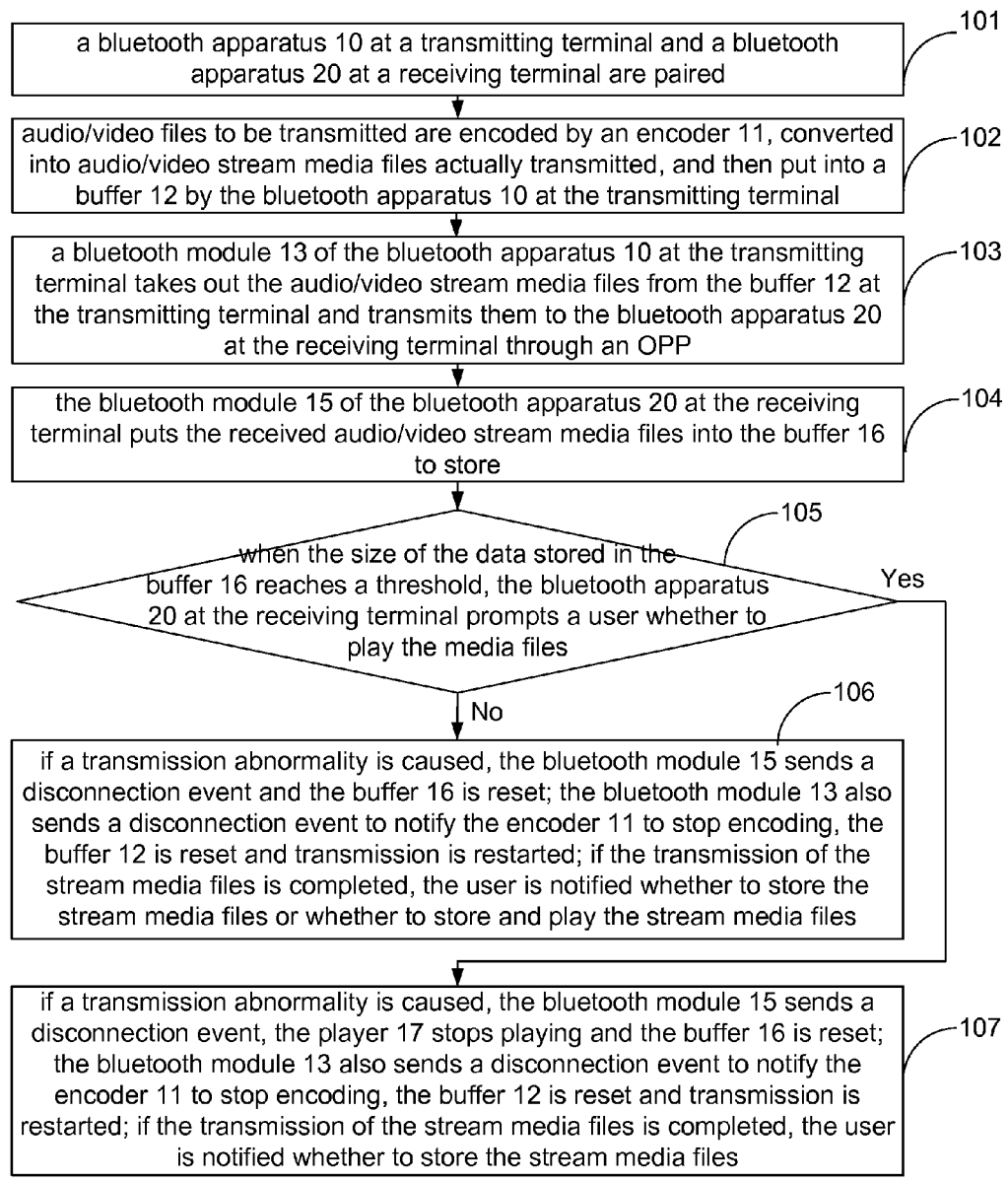
FIG. 4 shows a flowchart of a method according to the first embodiment provided by the disclosure.

In order to solve the problem in the prior art that audio or video playing can be carried out only after completion of transmission by bluetooth and waiting time is longer, the first embodiment provided by the disclosure is a method for transmitting multimedia data by bluetooth and real-time playing, wherein FIG. 1 shows a bluetooth apparatus 10 at a transmitting terminal for implementing the method of the embodiment, FIG. 2 shows a bluetooth apparatus 20 at a receiving terminal for implementing the method of the embodiment, and FIG. 3 shows a structure diagram of each part of a bluetooth system; the disclosure relates to the bluetooth apparatus 10 at the transmitting terminal and the bluetooth apparatus 20 at the receiving terminal. The bluetooth apparatus 10 at the transmitting terminal comprises an encoder 11, a buffer 12 and a bluetooth module 13. Audio and video files to be transmitted are encoded by the encoder 11 and converted into stream media files; then the obtained stream media files are put into the buffer 12; and then the bluetooth module 13 takes out the stream media file data from the buffer 12 and transmits the stream media files to the bluetooth apparatus 20 at the receiving terminal by an OPP of bluetooth. The bluetooth apparatus 20 at the receiving terminal comprises a bluetooth module 15, a buffer 16 and a player 17, wherein the bluetooth module 15 puts the received audio/video stream media files into the buffer 16, then the player 17 reads and plays the audio/video stream media files. As shown in FIG. 2, a process for transmitting audio/video multimedia files by a bluetooth OPP and real-time playing comprises the following steps:

step 101: the bluetooth apparatus 10 at the transmitting terminal and the bluetooth apparatus 20 at the receiving terminal are paired;

step 102: audio/video files to be transmitted are encoded by the encoder 11 of the bluetooth apparatus 10 at the transmitting terminal and converted into audio/video stream media files actually transmitted, and then the audio/video stream media files are put into the buffer 12;

step 103: the bluetooth module 13 of the bluetooth apparatus 10 at the transmitting terminal takes out the audio/video stream media files from the buffer 12 at the transmitting terminal and transmits them to the bluetooth apparatus 20 at the receiving terminal by the OPP;

step 104: the bluetooth module 15 of the bluetooth apparatus 20 at the receiving terminal puts the received audio/video stream media files into the buffer 16 to store;

step 105: when the data is stored in the buffer 16 for a certain period, the bluetooth apparatus 20 at the receiving terminal prompts a user whether to play the media files, if the user selects "Yes", the stream media player 17 of the bluetooth apparatus 20 at the receiving terminal is started and takes out the audio/video stream media files from the buffer 16 to play, and the process goes to step 107; if the user selects "No", the transmission continues, and the process goes to step 106;

step 106: it is determined whether a bluetooth transmission error occurs during a following transmission process, if a transmission abnormality is caused by bluetooth disconnection due to some reasons, the bluetooth module 15 of the bluetooth apparatus 20 at the receiving terminal sends a bluetooth disconnection event, and the buffer 16 is reset; the bluetooth module 13 of the bluetooth apparatus 10 at the transmitting terminal also sends a bluetooth disconnection event to notify the encoder 11 to stop encoding, and the buffer 12 is reset; then the transmission is restarted (the process goes to step 102);

if the transmission of the stream media files is completed, the bluetooth apparatus 20 at the receiving terminal prompts the user whether to store the stream media files or whether to store and play the stream media files; and step 107: it is determined whether a bluetooth transmission error occurs during a following transmission process, if a transmission abnormality is caused by bluetooth disconnection due to some reasons, the bluetooth module 15 of the bluetooth apparatus 20 at the receiving terminal sends a bluetooth disconnection event to notify the player 17 to stop playing, and the buffer 16 is reset; the bluetooth module 13 of the bluetooth apparatus 10 at the transmitting terminal also sends a bluetooth disconnection event to notify the encoder 11 to stop encoding, and the buffer 12 is reset; then the transmission is restarted (the process goes to step 102); if the transmission and playing of the stream media files are completed, the bluetooth apparatus 20 at the receiving terminal prompts the user whether to store the stream media files; during a process of calling data in the buffer 16 to play, the user can select to pause or back the data; when the user selects to pause the data, the transmission continues, just the stream media player pauses playing; when the user selects to continue playing, the files are played from a breakpoint; when the user backs the data to a previous time point, the transmission continues, just the player backs the data to the time point and starts playing from the time point.

The scheme provided by the embodiment of the disclosure realizes transmission of audio/video files by bluetooth commonly applied at present, what is more important, it also realizes real-time audio/video playing during bluetooth transmission. Taking a song with 6M played by an MP3 for example, if a transmission rate of the bluetooth OPP is 50 KB/S, then transmission time probably is 122 seconds. With the scheme provided by the embodiment of the disclosure, the period for a user to wait transmission is reduced and the user experience is improved; besides, the user can comment a song being transmitted based on real-time playing, and select whether to continue listening and store it.

The scheme of the embodiment provided by the disclosure generally introduces a concept of stream media playing based on bluetooth data transmission. bluetooth modules as communication lines are added to an encoder and a buffer at a transmitting terminal and to a stream media player and a buffer at a receiving terminal to lay a foundation for real-time playing. The buffer in the disclosure can be adjusted as needed; the size of the buffer is set according to the size of memory when an initial setting is made, for example, the buffer can be set to be of 50M if the entire memory is of 100M, or the buffer can be set of 20M if the entire memory is of 50M.

In the embodiment, the bluetooth apparatus 10 at the transmitting terminal and the bluetooth apparatus 20 at the receiving terminal can be cell phones or other Personal Digital Assistant (PDA) apparatuses; audio/video files are transmitted between cell phones by a bluetooth OPP and are received at the receiving terminal to be played. In normal situations, in order to transmit data by bluetooth among cell phones, bluetooth modules and processors are configured in cell phones at a transmitting terminal and at a receiving terminal. However, in the embodiment, a real-time playing function is added based on general data transmission; therefore, the encoder 11 and the buffer 12 are added to the bluetooth apparatus 10 at the transmitting terminal, wherein the encoder 11 and the buffer 12 are required to be connected with the processor and operate corresponding programs on the processor; correspondingly, the player 17 and the buffer 16 are required to be added to the bluetooth apparatus 20 at the receiving terminal, wherein the player 17 and the buffer 16 are required to be connected with the processor to realize the real-time playing function. In the bluetooth apparatus 10 at the transmitting terminal, the buffer 12 is used as a transmitting buffer and the input of the buffer 12 is files in stream media format processed by the encoder; in the bluetooth apparatus 20 at the receiving terminal, the buffer 16 is used as a receiving buffer and outputs files to the player 17. Under the condition that a common MP3 bit rate is 192 Kbps and the playing time of one song is 5 minutes, the size of the song is about 7 MB; therefore, the buffer in the embodiment is set to be of 7 MB; the size of the buffer can be adjusted flexibly as needed to transmit an MP3 file which meets requirements and play it in real time. In the bluetooth apparatus 10 at the transmitting terminal, files in MP3 format are converted into files in MP3 stream media format by the encoder; in the bluetooth apparatus 20 at the receiving terminal, the player 17 obtains Pulse Code Modulation (PCM) audio data by decoding the MP3 data stream and then plays music.

Step 101 to step 103 in the embodiment are processes at a transmitting terminal; is first, in step 101, two communication terminals perform pairing and input paired keys to accomplish mutual authentication; second, in step 102, before an application layer transmits audio/video files to be transmitted to an OPP protocol layer, the encoder 11 is called to encode the files into files in audio/video stream media format and then the encoded files are put into the buffer 12 to store; finally, step 103 indicates that the bluetooth module 13 takes out data from the buffer 12 and transmits the data to the OPP protocol layer of the bluetooth module 13 and then to the opposite side through the OPP protocol.

Step 104 to step 107 in the embodiment are processes at a receiving terminal; in step 104, the bluetooth module 15 puts the received audio/video stream media files into the buffer 16 to store; taking the MP3 mentioned above with size of 7M and with playing time of 5 minutes for example, the transmission time is about 110 seconds, which is calculated based on a bluetooth OPP transmission rate of 65 KB/s. Thus, data can be transmitted to the bluetooth apparatus 20 at the receiving terminal successfully before completion of playing if no special conditions appear. In normal situations, the bluetooth apparatus 20 at the receiving terminal is set to play in real time at 10 seconds after data is started to be transmitted, at this moment, a data rate of the bluetooth apparatus 20 at the receiving terminal reaches 650 KB and the data can be played for about 27 seconds; therefore, play fluency can be guaranteed. In step 105, when the 10 seconds passes, the bluetooth apparatus 20 at the receiving terminal gives a message box to prompt and inquire a user whether to play in real time; if the user selects "No", the process goes to step 106, the transmission continues and the player is not started until the transmission is completed, then the user is informed of completion of the transmission; if the user selects "Yes", the player is called to play, at this moment, the transmission is performed in the background. If the user selects to play in real time when the 10 seconds passes, the process goes to step 107; if a transmission abnormality is caused by bluetooth disconnection due to some reasons during the playing process, in the bluetooth apparatus 20 at the receiving terminal, the bluetooth module 15 sends a bluetooth disconnection event to notify the player 17 to stop playing and the buffer 16 is reset; in the bluetooth apparatus 10 at the transmitting terminal, the bluetooth module 13 also sends a bluetooth disconnection event to notify the encoder 11 to stop encoding, the buffer 12 is reset and the transmission is restarted (step 102 is executed); if the entire process is normal, the bluetooth apparatus 20 at the receiving terminal prompts the user to store after completion of the playing. If the user selects not to play when the 10 seconds passes, the process goes to step 106; during a following transmission process, if a transmission abnormality is caused by bluetooth disconnection due to some reasons, in the bluetooth apparatus 20 at the receiving terminal, the bluetooth module 15 sends a bluetooth disconnection event, and the buffer 16 is reset; in the bluetooth apparatus 10 at the transmitting terminal, the bluetooth module 13 also sends a bluetooth disconnection event to notify the encoder 11 to stop encoding, the buffer 12 is reset and the transmission is restarted (the process goes to step 102); if the entire process is normal, the bluetooth apparatus 20 at the receiving terminal prompts the user to store or to store and play after completion of the stream media file transmission.

Generally, transmission is finished before completion of playing, that is, transmitted data is completely stored in the buffer before music playing is finished; if a transmission speed is relatively slow due to some reasons, at this moment, the stream media player prompts a user that data buffering is in progress; the playing continues once new data arrives. When the playing is finished, the player exits and prompts the user that the data transmission is completed.

Obviously, those skilled in the art can make various changes and modifications to the disclosure without departing from the spirit and the scope of the disclosure; thus, if the modification and changes made to the disclosure belong to scope of the claims of the disclosure and the scope of equivalent technologies, these modifications and changes are deemed to be included in the disclosure.

What is claimed is:

1. A method for transmitting multimedia data by Bluetooth and real-time playing, comprising:
    encoding multimedia files to be transmitted and converting them into stream media files by a Bluetooth apparatus at a transmitting terminal;
    transmitting the stream media files by the Bluetooth apparatus at the transmitting terminal to a Bluetooth apparatus at a receiving terminal through an Object Push Profile (OPP); and
    receiving the stream media files and playing the received stream media files by the Bluetooth apparatus at the receiving terminal;
    wherein the step of transmitting the stream media files to a Bluetooth apparatus at a receiving terminal comprises:
    putting the stream media files into a buffer of the Bluetooth apparatus at the transmitting terminal by the Bluetooth apparatus at the transmitting terminal; and
    taking out the stream media files from the buffer of the Bluetooth apparatus at the transmitting terminal and transmitting the stream media files to the Bluetooth apparatus at the receiving terminal through the OPP by the Bluetooth apparatus at the transmitting terminal;
    the step of playing the received stream media files comprises:
    putting the received stream media files into a buffer of the Bluetooth apparatus at the receiving terminal by the Bluetooth apparatus at the receiving terminal; and
    taking out the stream media files from the buffer of the Bluetooth apparatus at the receiving terminal and playing them by the Bluetooth apparatus at the receiving terminal;
    wherein the method further comprises:
    when time for the Bluetooth apparatus at the receiving terminal to store the stream media files in the buffer of the Bluetooth apparatus at the receiving terminal reaches a threshold, prompting a user whether to play the stream media files, and taking out the stream media files from the buffer of the Bluetooth apparatus at the receiving terminal to play when the user selects to play;
    prompting the user whether to store the stream media files by the Bluetooth apparatus at the receiving terminal when transmission of the stream media files is completed.

2. The method according to claim 1, wherein when a size of the stream media files stored in the buffer of the Bluetooth apparatus at the receiving terminal reaches a threshold, the Bluetooth apparatus at the receiving terminal prompts the user whether to play the stream media files, and clear data stored in the buffer of the Bluetooth apparatus at the receiving terminal when the user selects not to play and following stream media files are transmitted abnormally; and
    the Bluetooth apparatus at the transmitting terminal clears data stored in the buffer of the Bluetooth apparatus at the transmitting terminal and stops encoding when determining there is a transmission abnormity.

3. The method according to claim 2, further comprising: prompting the user whether to store the stream media files or whether to store and play the stream media files by the Bluetooth apparatus at the receiving terminal when the user selects not to play and the transmission of the stream media files is completed.

4. The method according to claim 1, further comprising:
clearing data stored in the buffer of the Bluetooth apparatus at the receiving terminal and stopping playing them by the Bluetooth apparatus at the receiving terminal, when the Bluetooth apparatus at the receiving terminal determines following stream media files have a transmission abnormality during playing the stream media files;
clearing data stored in the buffer of the Bluetooth apparatus at the transmitting terminal and stopping encoding by the Bluetooth apparatus at the transmitting terminal when the Bluetooth apparatus at the transmitting terminal determines the stream media files have a transmission abnormity.

5. A system for transmitting multimedia data by Bluetooth and real-time playing, comprising a Bluetooth apparatus at a transmitting terminal and a Bluetooth apparatus at a receiving terminal, wherein
the Bluetooth apparatus at the transmitting terminal is configured to encode multimedia files to be transmitted, convert them into stream media files and transmit the stream media files to the Bluetooth apparatus at the receiving terminal through an Object Push Profile (OPP); and
the Bluetooth apparatus at the receiving terminal is configured to receive the stream media files and play the received stream media files;
wherein the Bluetooth apparatus at the transmitting terminal is further configured to put the stream media files into a buffer at the transmitting terminal, take out the stream media files from the buffer at the transmitting terminal and transmit the stream media files to the Bluetooth apparatus at the receiving terminal through the OPP; and
the Bluetooth apparatus at the receiving terminal is further configured to put the received stream media files into a buffer of the Bluetooth apparatus at the receiving terminal, take out the stream media files from the buffer of the Bluetooth apparatus at the receiving terminal and play them;
wherein the Bluetooth apparatus at the receiving terminal is further configured, when time for the Bluetooth apparatus at the receiving terminal to store the stream media files in the buffer of the Bluetooth apparatus at the receiving terminal reaches a threshold, to prompt a user whether to play the stream media files, and take out the stream media files from the buffer of the Bluetooth apparatus at the receiving terminal to play when the user selects to play; and
when transmission of the stream media files is completed, the Bluetooth apparatus at the receiving terminal is further configured to prompt the user whether to store the stream media files.

6. The system according to claim 5, wherein the Bluetooth apparatus at the receiving terminal is further configured, when a size of the stream media files stored in a buffer of the Bluetooth apparatus at the receiving terminal reaches a threshold, to prompt a user whether to play the stream media files, and clear data stored in the buffer of the Bluetooth apparatus at the receiving terminal when the user selects not to play and following stream media files are transmitted abnormally; and
the Bluetooth apparatus at the transmitting terminal is further configured to clear data stored in a buffer of the Bluetooth apparatus at the transmitting terminal and stop encoding when determining that the stream media files have a transmission abnormity.

7. The system according to claim 5, wherein the Bluetooth apparatus at the transmitting terminal is further configured to prompt a user whether to store the stream media files or whether to store and play the stream media files when the user selects not to play and the transmission of the stream media files is completed.

8. The system according to claim 5, wherein the Bluetooth apparatus at the receiving terminal is further configured, during playing the stream media files, to clear data stored in a buffer of the Bluetooth apparatus at the receiving terminal and stop playing when determining following stream media files have a transmission abnormality; and
the Bluetooth apparatus at the transmitting terminal is further configured to clear data stored in a buffer of the Bluetooth apparatus at the transmitting terminal and stop encoding when determining that the stream media files have a transmission abnormity.

\* \* \* \* \*